W. B. FEATHERSTONE.
MOTION PICTURE FILM.
APPLICATION FILED JUNE 1, 1907.
1,126,188.
Patented Jan. 26, 1915.
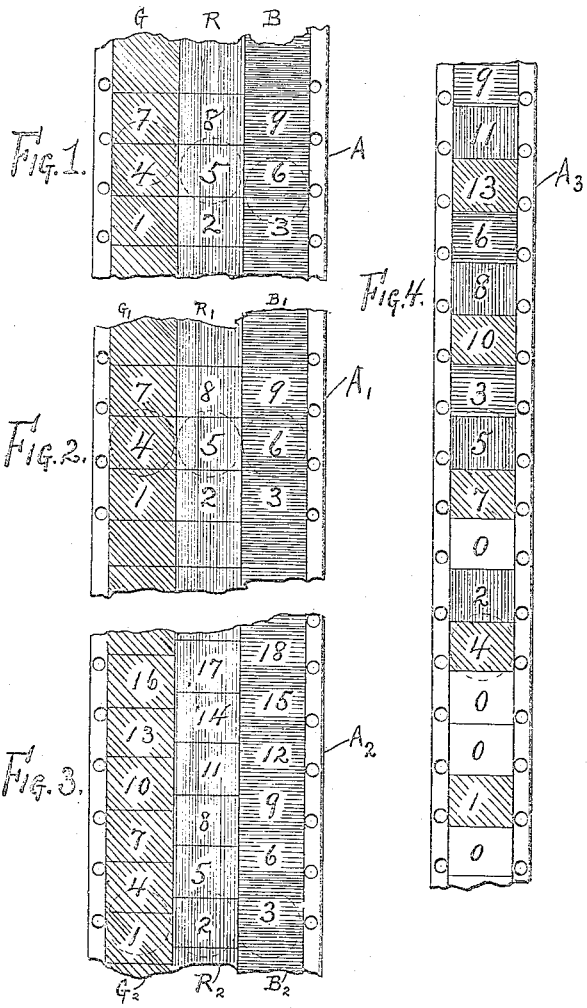

UNITED STATES PATENT OFFICE.

WILLARD B. FEATHERSTONE, OF WASHINGTON, DISTRICT OF COLUMBIA, ASSIGNOR, BY MESNE ASSIGNMENTS, TO H. P. PATENTS AND PROCESSES COMPANY, INC., A CORPORATION OF NEW YORK.

MOTION-PICTURE FILM.

1,126,188.  Specification of Letters Patent.  Patented Jan. 26, 1915.

Original application filed January 23, 1907. Serial No. 353,635. Divided and this application filed June 1, 1907. Serial No. 376,855.

*To all whom it may concern:*

Be it known that I, WILLARD B. FEATHERSTONE, a citizen of the United States, residing at Washington, in the District of Columbia, have invented a new and useful Motion-Picture Film, of which the following is a specification.

My invention relates to the art of recording and reproducing objects and scenes through rapidly successive photographic images, and has for its object the projection of a flickerless picture in natural colors. The films herein described are those described in my previous application filed Jan. 23rd, 1907, Serial Number 353,635 of which this application is a division.

My invention consists in a film for the production of motion-pictures, which film has a plurality of series of consecutive images divided into successive groups, each series of images being differently translucent for the purpose of reproducing hues similar to those of an original subject or scene, the translucency varying in place and degree to correspond with the intensity and distribution of a certain color in an original.

It further consists, broadly, in a film having a number of photographic positive images, so arranged, that when projected, the projection of one image will overlap or dissolve into the projection of another image.

In the accompanying drawing, Figure 1 shows a film with three series of images for use with a machine having the lenses "stepped" as indicated by dotted lines. Fig. 2 shows the same film as used with intermittent feed machines, the lenses of the machine being indicated by dotted lines. Fig. 3 shows a three-series film in which the images are "stepped." Fig. 4 shows a single strip film having three series of images.

Similar reference characters refer to like parts throughout the several views.

The film described in this application and shown in Fig. 3, may be produced by and used in connection with the apparatus described and shown in my former application above referred to. In making the exposures or projecting the views, the film moves continuously, while the optical parts reciprocate alternately, first moving regularly with the film and then quickly returning to a position opposite the succeeding portion of the film. The return of a given lens is made while the view through the lens is occulted, the other lenses being exposed. Positives may be made on similar strips of films by contact in the usual manner. For colored reproduction, the exposures are made through color filters, the projections being similarly colored by color filters, or the film itself may be stained or dyed, each series differently.

The shading of the several views indicates in general the color of the filter through which a series of negatives would be taken looking to normal color effects in reproduction, and also the color of the filter or the stain used with the positives in projection.

In Figs. 1, 2 and 3, A, $A_1$, $A_2$ represent negative films. Series G, $G_1$, and $G_2$, were taken through a green filter, series R, $R_1$, and $R_2$, through a red filter, and series B, $B_1$, and $B_2$, through a blue filter.

In Fig. 4, the images 1, 4, 7, 10, and 13 constituting a portion of one series, have been modified by a green filter, and images 2, 5, 8 and 11, etc., have been modified by a red filter, and images 3, 6, 9, etc., by a blue filter.

The object of my new method is not only the analysis and synthesis of motion by means of pictures, but also the colored and lifelike reproduction of objects in which motion may or may not be an important feature. In fact, perfectly flickerless projections in colors offer a comparatively simple solution of the problem of "color photography", whether of stationary or moving objects. The flicker is avoided by projecting an image of one series of positives upon the viewing screen before the preceding image (of another series) has been occulted. The "dissolving" is so perfect as to be unnoticeable. Steadiness of the view is further assured by the extra width of the film and its slow and continuous motion.

In practice it will be found convenient to stain the positive film, say red, green and blue, (Fig. 3), instead of projecting the black and white images through color filters, it being obvious that similar blended hues will result. A complete picture is inferred to be in natural colors, hence each monochromatic section of film has only a partial image, which is but a factor of the picture. In the claims the expression "picture factor" is used to denote that part of a full image which was photographed by light of a single primary color. A "primary color" is held to be some shade of red, green, or blue-violet, sufficiently pure for practical reproductions, but not necessarily correct spectroscopically, nor is my invention limited to the exact styles of film shown and described, its principal object being to do away with separate color filters and the complications which they involve, thus removing the chief difficulty in the projection of naturally colored pictures.

I claim:

1. A motion picture film having plural series of images representing successive aspects of an object or scene, a portion of the images having color values different from those of another portion, each portion being colored uniformly to correspond with its color values.

2. A motion picture film having plural series of picture factors, collectively representing successive aspects of an object or scene, each series having different color values to correspond with a different primary color, and uniformly stained with that color.

3. A film provided with images representing successive aspects of an object or scene, the images being divided into plural series, each of which represents different color values, and is differently and uniformly stained, the color values and color stain of each series corresponding with one of the primary colors.

4. Plural series of picture factors collectively representing successive aspects of an object or scene, each factor being uniformly colored and having color values to correspond with one of the primary color sensations, each series having an equal number of factors, and all the factors in any one series having substantially the same color and color values.

5. A motion picture film divided into image areas differently and uniformly colored in groups of two or more to correspond with the primary color sensations, each area comprising a picture factor having color values corresponding with its color.

6. A motion picture film having plural series of picture factors, each series being translucent to one primary color only, and having corresponding color values.

WILLARD B. FEATHERSTONE.

Witnesses:
   CHAS. C. GOODRICH,
   LILLIE E. GOODRICH.